Patented Nov. 9, 1937

2,098,835

UNITED STATES PATENT OFFICE 2,098,835

EXTRACTING GOLD AND/OR SILVER FROM ORES, ETC.

Barclay K. Read, John S. Godard, and Wilfred N. Hall, Toronto, Ontario, Canada, assignors to E. I. du Pont de Nemours & Company, Inc., Wilmington, Del., a corporation of Delaware No Drawing. Application April 2, 1935, Serial No. 14,374. In Canada May 2, 1934

2 Claims. (Cl. 75—2)

This invention relates to an improved method of extracting gold and/or silver from ores, concentrates and other products from mining or metallurgical operations, containing one or both of these constituents. More particularly it relates to the treatment of ores, concentrates and other products from mining or metallurgical operations containing gold and/or silver by an improved method of cyanidation or by cyanidation followed by flotation for increasing the recovery of the metal.

It is well known that the addition of lime as a protective alkali in the operation of extracting gold and/or silver by cyanide compounds improves the extraction and it has been considered impossible for the cyanidation extraction to function without the addition of lime.

The use of lime presents certain disadvantages in the cyanide process. For example, it causes the fine particles to coagulate which retards classification and has a tendency to form "islands" and scale in the thickeners and agitators. In the filters, clarifiers and precipitation presses, the lime compounds collecting in the fibres of the cloth, have to be frequently removed by acid treatment, which greatly reduces the life of the cloth.

Where cyanide tailings are subjected to a flotation operation, the lime remaining in the tailings acts as a depressant and interferes materially with the efficiency of the flotation operation.

The object of the present invention is to increase the recovery of gold and/or silver from ores, concentrates and other products from mining or metallurgical operations, containing one or both of these constituents.

This object may be accomplished by the use of (1) ammonia in conjunction with a cyanide compound, (2) ammonia in conjunction with another alkali material, e. g. lime, caustic soda, etc., and a cyanide compound, (3) ammonium salts, e. g. ammonium sulphate, ammonium chloride, ammonium per sulphate, etc., in conjunction with an alkaline material such as caustic soda, lime, etc., capable of producing free ammonia from the ammonium salt, in situ, and a cyanide compound, (4) any of the above three methods in conjunction with a flotation operation.

We have discovered that by partly or wholly replacing the lime by ammonia in the extraction of gold and/or silver from ores, concentrates and other products from mining or metallurgical operations by the cyanide process, improved results are obtained to the extent that the extraction of the metal is more complete than with lime alone, and that the ammonia acts as a disperser of the finer particles of the mineral pulp, and this dispersing action improves classification.

We have further found that ammonia in the pulp lowers the compression zone in the thickener, thus permitting a denser thickener underflow to be obtained and that in pulps of given densities, a pulp containing ammonia will be less viscous than one in which ammonia is not present. As a result of the dispersing action of the ammonia in cyanide pulps, and the lowering of their viscosities due to the presence of the ammonia, the tendency to form "islands" in the thickeners and agitators is greatly reduced, while in pulps containing given protective alkalinities, one containing both ammonia and lime will have a much lesser tendency to froth than one containing lime alone. Similarly pulps containing ammonia have been found to have a much lesser tendency to form scale in the thickeners and agitators, than pulps containing lime alone, and the dispersing effect of the ammonia increases the washing effect on the filters and tends to prevent the formation of lime compounds in the filter cloths in filters, clarifiers and precipitation presses.

We have further found, when cyanide tailings, from a cyanidation operation in which the protective alkali lime is partly or wholly replaced by ammonia, are subjected to a flotation operation, the depressing effect of the total alkali is less than when lime alone is used to provide that alkalinity. By reducing the amount of lime in the cyanide tailings a point is reached when there is insufficient lime present to coat the particles of the ore to effect their surfaces and in consequence the depressing effect of the lime is greatly reduced.

Comparative tests show that when a cyanide solution contains more than .75 pound of lime per ton of solution and the cyanide tailings are subjected to a flotation operation, the depressing effect of the lime is very marked.

Nevertheless in order to obtain the required alkalinity, it is usually necessary to use about 1.25 to 1.1 pounds of lime per ton of solution. However, a corresponding alkalinity can be obtained by using about 0.67 pound (the equivalent amount) of ammonia without encountering the marked depressing effect produced by lime.

Thus when the amount of protective alkali is kept constant through the steps of gradually replacing the lime by ammonia to the final stage of complete replacement, the depressing effect of the lime is largely overcome.

The preferred method of carrying out our invention is as follows:

The total optimum alkalinity required in terms of lime is determined by experiment, on the ore, concentrate, or other product from a mining or metallurgical operation, as the amount of protective alkali required varies with different ores, etc. After determining the amount of lime required for the material, by experiment, we replace fractionally the lime by ammonia until a point is reached where the best results are obtained on that material.

In carrying out our invention on a large scale operation of milling, cyanidation and flotation, the cyanide compound, lime and/or ammonia may be introduced in the circuit in the same general way as practiced where lime alone was formerly used. On account of the fairly rapid circulation of the mill solutions, the point of introduction is immaterial. In order to maintain the strength of solution to give the best results under operating conditions, samples of the solution are taken from various points in the mill, at convenient intervals of time. These samples are titrated for cyanide, lime and/or ammonia and the necessary adjustments made.

The invention will be readily understood from consideration of the following examples:

EXAMPLE 1

*Treatment of ores containing gold and silver*

In each test 1000 gram sample of 48 mesh ore was ground in a ball mill for sixty minutes, transferred to an agitator jar and agitation was carried on for twenty-four hours in a solution containing 0.14% sodium cyanide, lime and/or ammonia.

Head sample to tests contained—gold 4.43 ounces per ton and silver 6.42 ounces per ton.

| Test | Strength of solutions | | Ore | |
|---|---|---|---|---|
| | Lime as CaO | Ammonia as NH$_3$ | Tailings contained | Recovery |
| 1 | 0.09% | Nil | Gold 3.47 oz. per ton / Silver 3.53 oz. per ton | *Percent* Gold 21.7 / Silver 45.0 |
| 2 | 0.045% | 0.025% | Gold .70 oz. per ton / Silver 2.78 oz. per ton | Gold 84.2 / Silver 56.7 |
| 3 | Nil | 0.05% | Gold 0.04 oz. per ton / Silver 2.78 oz. per ton | Gold 99.1 / Silver 67.3 |

EXAMPLE 2

*Treatment of ore containing silver*

In each test 1000 grams of the ore, dry crushed to minus 20 mesh, was wet ground to approximately 98% minus 200 mesh and agitated in cyanide solution for 47 hours. Dilution during grinding was to 57.2% solids. Cyanide solution strength was 0.25% NaCN during grinding and agitation. Dilution during agitation was 3:1. Lime and/or ammonia were added to the grinding mill.

Head sample to tests contained silver 95.8 ounces per ton.

| Test | Strength of solutions | | Ore | |
|---|---|---|---|---|
| | Lime as CaO | Ammonia as NH$_3$ | Tailings contained silver ozs. per ton | Recovery |
| 1 | 0.201% | Nil | 34.2 | *Percent* 64.3 |
| 2 | 0.114% | 0.053% | 33.2 | 65.3 |
| 3 | 0.076% | 0.085% | 31.2 | 67.4 |
| 4 | Nil | 0.120% | 33.7 | 64.8 |

EXAMPLE 3

*Treatment of ore containing gold*

In each test 1000 gram sample of 20 mesh ore was ground in a cyanide solution in a ball mill for 60 minutes. Dilution during grinding 3:1 with a cyanide solution containing 0.04% NaCN and agitated for 24 hours, at the conclusion of the agitation period the ore pulp was filtered.

Results of cyanidation.

Head sample to tests contained gold 0.226 ounce per ton.

| Test | Strength of solutions | | Ore | |
|---|---|---|---|---|
| | Lime as CaO | Ammonia as NH$_3$ | Tailings contained gold oz. per ton | Recovery |
| 1 | *Percent* 0.08 | Nil | 0.082 | *Percent* 64.2 |
| 2 | 0.065 | 0.018 | 0.080 | 64.7 |
| 3 | 0.057 | 0.036 | 0.074 | 67.3 |
| 4 | 0.050 | 0.054 | 0.077 | 66.0 |

The cyanide tailings from each test were repulped and filtered and then subjected to a flotation operation, using the following flotation reagents and conditioned for 5 minutes.

|  | lbs. per ton of tailings |
|---|---|
| Na$_2$CO$_3$ | 2 |
| CuSO$_4$ | 1 |
| Potassium ethyl xanthate | 0.20 |
| "du Pont Frothers" | 0.10 |

The "du Pont Frothers" mentioned above were of the grade having a boiling range of about 147 to 157° C. "du Pont Frothers" is the trade name of proprietary compositions supplied by the E. I. du Pont de Nemours & Co., Inc., for use as flotation agents. These consist of a mixture of oxygenated hydrocarbons obtainable by the pressure catalytic hydrogenation of carbon oxides and comprise principally branched-chain aliphatic alcohols having five or more carbon atoms per molecule. The "du Pont Frothers" are supplied in several grades, identified by different boiling point ranges.

*Flotation results*

| Test product | Weight | Assay-gold oz. per ton | Contents-gold oz. per ton | Distribution |
|---|---|---|---|---|
| | *Percent* | | | *Percent* |
| 1. Concentrates | 12.5 | 0.420 | 0.053 | 64.5 |
| Tail | 87.5 | 0.033 | 0.029 | 35.5 |
| Total | 100.0 | | 0.082 | 100.0 |
| 2. Concentrates | 14.6 | 0.410 | 0.060 | 75.2 |
| Tail | 85.4 | 0.023 | 0.020 | 24.8 |
| Total | 100.0 | | 0.080 | 100.0 |
| 3. Concentrates | 15.4 | 0.400 | 0.061 | 83.1 |
| Tail | 84.6 | 0.015 | 0.013 | 16.9 |
| Total | 100.0 | | 0.074 | 100.0 |
| 4. Concentrates | 15.5 | 0.430 | 0.067 | 86.8 |
| Tail | 84.5 | 0.012 | 0.010 | 13.2 |
| Total | 100.0 | | 0.077 | 100.0 |

| Summary of tests | Cyanidation and flotation | | |
|---|---|---|---|
| Test | Recovery by cyanidation | Recovery by flotation | Overall recovery cyanidation and flotation |
| | *Percent* | *Percent* | *Percent* |
| 1 | 64.2 | 23.1 | 87.3 |
| 2 | 64.7 | 26.5 | 91.2 |
| 3 | 67.3 | 27.2 | 94.5 |
| 4 | 66.0 | 29.5 | 95.5 |

EXAMPLE 4

*Cyanidation of an auriferous pyrite concentrate*

A sample of concentrate was agitated for 24 hours in a solution containing 0.3% sodium cyanide, lime and/or ammonia. Dilution during agitation was 3:1.

Head sample to tests contained gold 2.19 ounces per ton.

| Strength of solutions | | | Ore concentrates | |
| --- | --- | --- | --- | --- |
| Test | Lime as CaO | Ammonia as NH$_3$ | Tailings contained gold oz. per ton | Recovery |
| 1 | 0.20% | Nil | 0.96 | 56.1% |
| 2 | Nil | 0.84% | 0.84 | 61.9% |

The above examples illustrate the use of ammonia as such, but we do not wish to limit ourselves to ammonia alone, as we have found that we can use ammonium salts such as ammonium sulphate, ammonium chloride, ammonium persulphate and other ammonium salts in conjunction with a material such as caustic soda, lime or other strong alkalies capable of liberating free ammonia from the ammonium salt, in situ, and a cyanide compound.

Although our invention has been described with reference to certain specific examples, it will be understood it is not limited to these examples, but may be modified in various respects without departing from the scope thereof.

What is claimed is:

1. A method of extracting gold and/or silver from ores and other products from mining and metallurgical operations containing one or both of these constituents which comprises subjecting such ores and other products to the action of ammonia in conjunction with a cyanide compound, separating the tailings from the cyanide operation and subjecting said tailings to a flotation operation.

2. A method of extracting gold and/or silver from ores and other products from mining and metallurgical operations containing one or both of these constituents which comprises subjecting such ores and other products to the action of ammonia in conjunction with lime and a cyanide compound, the quantity of lime used being less than 0.75 pound per ton of solution the quantity ordinarily required for the cyanidation extraction of gold or silver, separating the tailings from the cyanide operation and subjecting said tailings to a flotation operation.

BARCLAY K. READ.
JOHN S. GODARD.
WILFRED N. HALL.